United States Patent
Maisonneuve (10) Patent No.: US 11,498,030 B2
(45) Date of Patent: Nov. 15, 2022

(54) FLUID SYSTEM

(71) Applicant: Oakland University, Rochester, MI (US)

(72) Inventor: Jonathan Maisonneuve, Auburn Hills, MI (US)

(73) Assignee: Oakland University, Rochester, MI (US)

( * ) Notice: Subject to any disclaimer, the term of this patent is extended or adjusted under 35 U.S.C. 154(b) by 287 days.

(21) Appl. No.: 16/635,738

(22) PCT Filed: Jul. 31, 2018

(86) PCT No.: PCT/US2018/044525
§ 371 (c)(1),
(2) Date: Jan. 31, 2020

(87) PCT Pub. No.: WO2019/027969
PCT Pub. Date: Feb. 7, 2019

(65) Prior Publication Data
US 2020/0222854 A1  Jul. 16, 2020

Related U.S. Application Data (60) Provisional application No. 62/539,052, filed on Jul. 31, 2017.

(51) Int. Cl.
*B01D 61/06* (2006.01)
*B01D 61/00* (2006.01)
(Continued)

(52) U.S. Cl.
CPC .......... *B01D 61/002* (2013.01); *F03G 7/005* (2013.01); *B01D 2313/246* (2013.01)

(58) Field of Classification Search
CPC ............... B01D 29/00; B01D 29/0002; B01D 29/0093; B01D 29/01; B01D 29/05;
(Continued)

(56) References Cited

U.S. PATENT DOCUMENTS

| | | |
|---|---|---|
| 2008/0169723 A1 | 7/2008 | Thorsen et al. |
| 2009/0071902 A1 | 3/2009 | Stover et al. |
| 2014/0007564 A1 | 1/2014 | Efraty |

FOREIGN PATENT DOCUMENTS

WO  2011064252 A1  6/2011

OTHER PUBLICATIONS

W. He et al. / Desalination 389 (2016) 187-196 (Year: 2016).*
(Continued)

Primary Examiner — Allison G Fitzsimmons
(74) Attorney, Agent, or Firm — Fishman Stewart PLLC (57) ABSTRACT

A fluid system includes a membrane module including a first section and a second section that are separated by a semi-permeable membrane, a feed pump connected to the first section, a draw pump connected to the second section, a load connected to the second section, a flush valve, and an electronic control unit (ECU) configured to control one or more of the feed pump, the draw pump, the flush valve, and the load. The ECU may be configured to control the feed pump, the draw pump, the flush valve, and/or the load according based on or according to net power generation.

9 Claims, 7 Drawing Sheets

(51) Int. Cl.
*F03G 7/00* (2006.01)
*B01D 37/00* (2006.01)

(58) Field of Classification Search
CPC ........ B01D 35/30; B01D 37/00; B01D 37/04;
B01D 37/043; B01D 37/046; B01D
61/00; B01D 61/002; B01D 61/0022;
B01D 61/0024; B01D 61/02; B01D
61/025; B01D 61/06; B01D 61/08; B01D
61/12; B01D 63/00; B01D 63/08
USPC ...... 210/767; 321/6, 321.72, 321.75, 321.84,
321/483, 512.1
See application file for complete search history.

(56) References Cited

OTHER PUBLICATIONS

G. O'Toole et al. / Desalination 389 (2016) 39-51 (Year: 2016).*
International Search report dated Oct. 1, 2018 for copending International Application No. PCT/US2018/044525.

* cited by examiner

FLUID SYSTEM

CROSS-REFERENCE TO RELATED APPLICATION

This application is a national phase application of and claims priority to International Patent Application No. PCT/US2018/044525, filed Jul. 31, 2018, which claims the benefit of U.S. Provisional Patent Application Ser. No. 62/539,052, filed on Jul. 31, 2017, the disclosure of which is hereby incorporated herein by reference in its entirety.

TECHNICAL FIELD

The present disclosure generally relates to fluid systems and methods of controlling fluid systems, such as fluid systems involving pressure retarded osmosis.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid systems do not operate efficiently. Controlling fluid systems in a more efficient manner may increase power generation, decrease power consumption, and/or increase net power.

There is a desire for solutions/options that minimize or eliminate one or more challenges or shortcomings of fluid systems. The foregoing discussion is intended only to illustrate examples of the present field and should not be taken as a disavowal of scope.

SUMMARY

In embodiments, a fluid system may include a membrane module including a first section and a second section that may be separated by a semipermeable membrane, a feed pump connected to the first section, a draw pump connected to the second section, a flush valve connected to the first section, a load connected to the second section, and/or an electronic control unit (ECU). In an embodiment, the ECU may be configured to control operation of one or more of the feed pump, the draw pump, the flush valve, and the load. In embodiments, the ECU may be configured to control operation of the feed pump, the draw pump, the flush valve, and the load based on or according to net power generated.

With embodiments, a method of controlling a fluid system may include providing a membrane module including a first section and a second section that are separated by a semipermeable membrane; providing, via a feed pump connected to the first section, a first fluid to the first section; providing, via a draw pump connected to the second section, a second fluid to the second section; increasing a fluid pressure in the second section via pressure retarded osmosis; and controlling and/or maximizing a net power generated by a load connected to the second section. Maximizing the net power generated may include controlling, via an electronic control unit, one or more of a speed of a feed pump, a speed of a draw pump, a resistance of a flush valve, and a resistance of a load.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
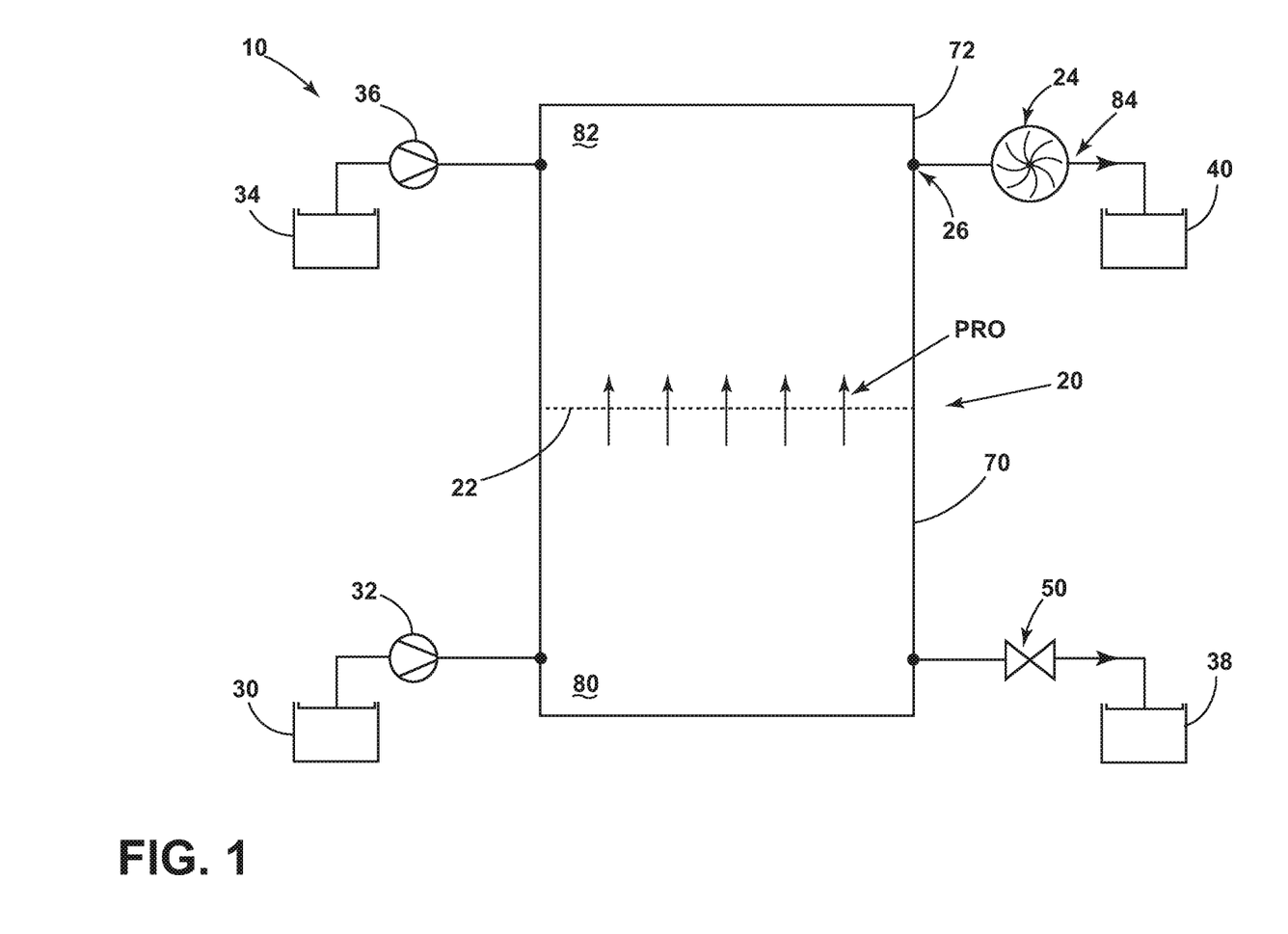
FIG. 1 is a schematic view generally illustrating an embodiment of a fluid system according to aspects and teachings of the present disclosure.

In some circumstances, chemical potential energy may be released as entropy when liquid solutions of different concentrations mix, for example where fresh water meets the sea (e.g., salt water). In embodiments, such as generally illustrated in FIG. 1, a fluid system 10 may be configured for a hydro-mechanical energy conversion process (which may be referred to as pressure retarded osmosis or PRO) that may include converting or harnessing this potential energy to useful work. During a PRO process, concentrated and diluted solutions may be supplied to opposite sides of a semipermeable membrane 22 of a membrane module 20, and a load 24 (e.g., a hydroelectric turbine) may be connected to an outlet 26 of a concentrated side of the membrane module 20. With such an arrangement, solvent may spontaneously permeate across the membrane 22 via osmosis and perform a change or work on the load 24 (e.g., may increase a fluid pressure to cause rotation of a turbine).

In embodiments, a maximum power transfer may occur under specific loading conditions, which may correspond to a specific retarding pressure. Under ideal/theoretical conditions, a maximum power transfer may occur if a load 24 offers the same or similar resistance to water flow as does the semipermeable membrane 22. Under real or actual conditions, maximum power transfer may occur with a somewhat different load. A maximum power point tracking (MPPT) control strategy for obtaining loading conditions that yield maximum power transfer may be desirable. In embodiments, an MPPT control strategy may include, for example, controlling supply flow rates for diluted solutions (e.g., fresh water) and/or concentrated solutions (e.g., salt water). Controlling flow rates may reduce or minimize the overall effect of several non-ideal phenomena on power generation during PRO.

Figure 2:
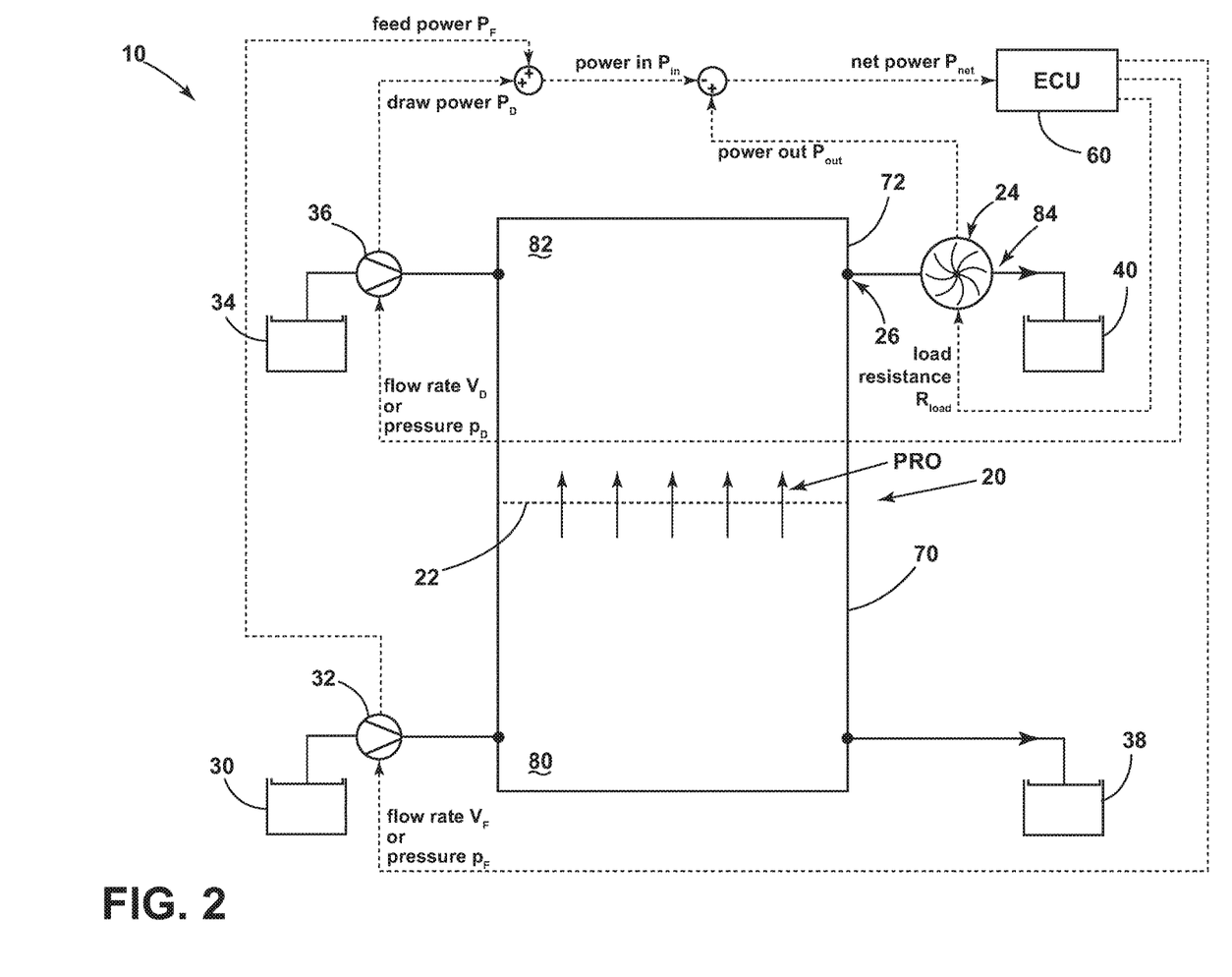
FIG. 2 is a schematic view generally illustrating an embodiment of a fluid system according to aspects and teachings of the present disclosure.
Figure 3:
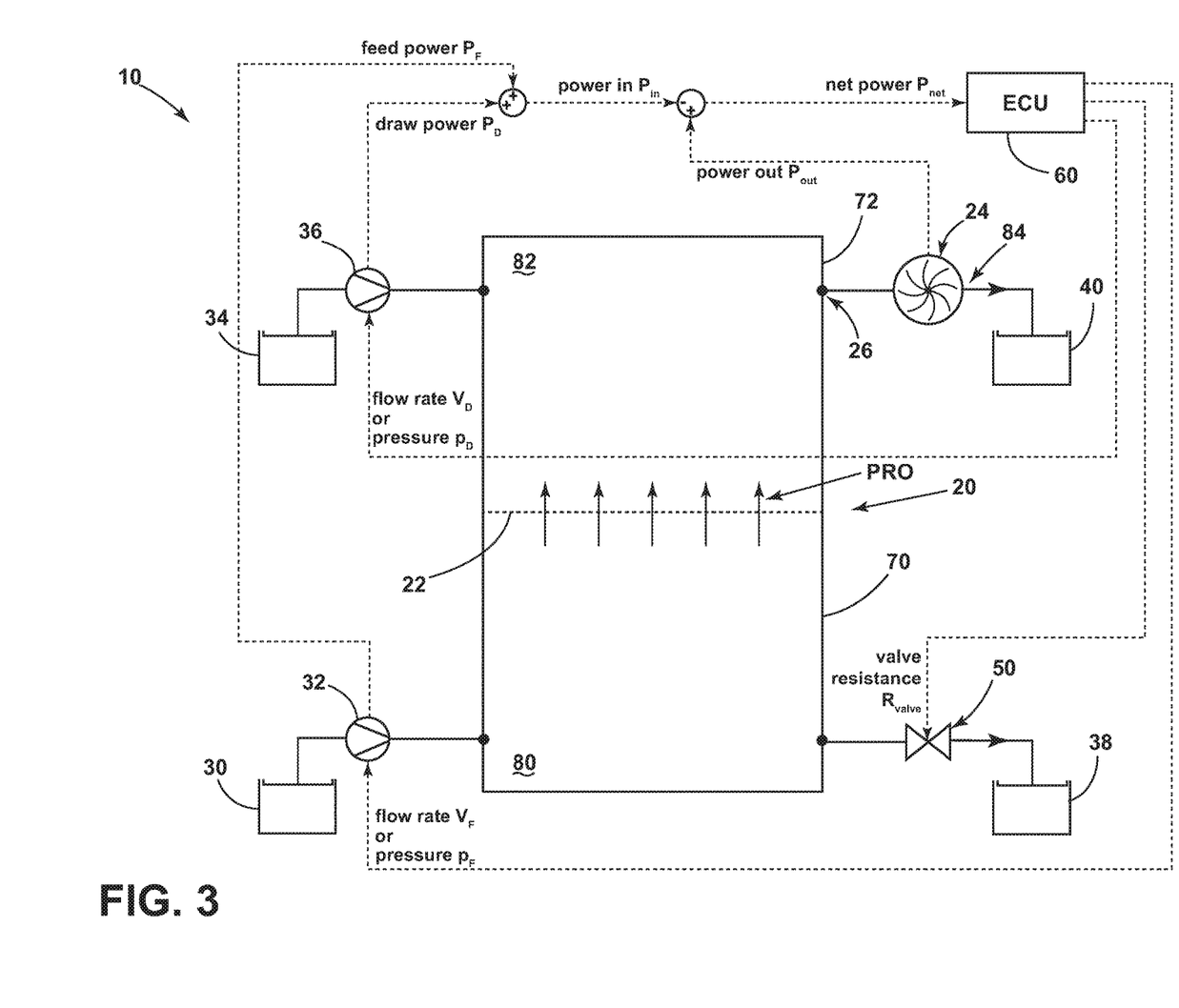
FIG. 3 is a schematic view generally illustrating an embodiment of a fluid system according to aspects and teachings of the present disclosure.

With embodiments, such as generally illustrated in FIGS. 1, 2, and 3, a fluid system 10 may include a membrane module 20, a load 24, a feed source 30, a feed pump 32, a draw source 34, a draw pump 36, a first sink 38, a second sink 40, a flush valve 50, and/or an electronic control unit (ECU) 60. A membrane module 20 may include a first section 70 and/or a second section 72 (e.g., first and second fluid chambers). The first section 70 and the second section 72 may be separated by a membrane 22—such as a semipermeable membrane. A semipermeable membrane 22 may permit a first fluid 80 (e.g., fresh water) to move from the first section 70 through the semipermeable membrane 22 to the second section 72, which may include a second fluid 82 (e.g., salt water), via pressure retarded osmosis. The first section 70 and the second section 72 may be in fluid communication via the semipermeable membrane 22 and may not otherwise be in fluid communication. The second fluid 82 may, for example and without limitation, include a higher concentration of salt than the first fluid 80.

With embodiments, a feed pump 32 may be connected to a feed source 30. A feed source 30 may include a fluid, such as the first fluid 80, and the feed pump 32 may be configured to pump the first fluid 80 from the feed source 30 to the membrane module 20. For example and without limitation, a feed source 30 may include fresh water 80 and a feed pump 32 may provide the fresh water 80 from the feed source 30 to the first section 70 of the membrane module 20. A draw pump 36 may be connected to a draw source 34. A draw source 34 may include a fluid, such as the second fluid 82, and a draw pump 36 may be configured to pump the second fluid 82 from the draw source 34 to the membrane module 20. For example and without limitation, a draw source 34 may include salt water 82 and a draw pump 36 may provide the salt water 82 from the draw source 34 to the second section 72 of the membrane module 20.

In embodiments, a load 24 may be connected to (e.g., in fluid communication with) the second section 72 of the membrane module 20 (see, e.g., FIGS. 1-3). The load 24 may include, for example, a hydroelectric turbine that may provide a variable resistance to fluid flow out of the second section 72. For example and without limitation, the load 24 may provide one or more fluid flow resistance levels, such as in addition to allowing full flow or no flow. As fluid flows through a load 24, the load 24 may generate mechanical energy. A load 24 may include and/or be connected with a generator that may convert the mechanical energy to electrical power. A fluid output 84 of the load 24 may be connected to a sink or reservoir, such as the second sink 40. With embodiments, a flush valve 50 may be connected to the first section 70 of the membrane module 20 (see, e.g., FIGS. 1 and 3). A flush valve 50 may control a flow of fluid (e.g., first fluid 80) out of the first section 70 into a sink or reservoir, such as the first sink 38, and/or may provide a variable resistance to such fluid flow.

In embodiments, an ECU 60 may be configured to control and/or optimize one or more aspects of a fluid system 10, such as a feed pump 32, a draw pump 36, a load 24, and/or a flush valve 50. An ECU 60 may, for example, include and/or be a part of a closed loop feedback control system that may optimize power transfer via coordinated control of a feed pump pressure $P_F$ or flow rate $V_F$, a draw pump pressure $P_D$ or flow rate $V_D$, a load resistance $R_{load}$, and/or a flush valve resistance $R_{valve}$. For example and without limitation, a feed pump 32 and a draw pump 36 may include variable speed and/or variable displacement pumps and an ECU 60 may control the outputs of the feed pump 32 and/or the draw pump 36 via controlling the speeds, pressures, and/or displacements of the draw and feed pumps 32, 36. An ECU 60 may be configured to control a resistance $R_{load}$ (e.g., a fluid flow resistance) of a load 24 and/or a resistance of a flush valve $R_{valve}$. In embodiments, a turbine may be provided as a load 24 and the turbine may be coupled to a generator. As generally illustrated in FIG. 2, an ECU 60 may be configured to control and/or provide control commands (e.g., signals, set values, etc.) to power electronics that control the turbine and/or the generator, which may control the resistance $R_{load}$ of the load 24.

In embodiments, an ECU 60 may be configured to receive feedback from a fluid system 10. Feedback from a fluid system 10 may include, for example, a measurement of net power generated by the system $P_{net}$. A net power generated by the system $P_{net}$ may comprise the electrical power generated via the load 24 less the electrical power consumed/used by the feed pump 32 and/or the draw pump 36. An ECU 60 may generate control commands according to feedback from the fluid system 10. For example and without limitation, the ECU 60 may be configured to analyze feedback from the fluid system 10 via one or more methods, such as mass feedback control, fuzzy logic control, perturb and observe, and/or incremental mass resistance, among others. An ECU 60 may generate control commands or signals from such analysis and such control commands may include desired flow rates $V_F$, $V_D$, pressures $P_F$, $P_D$, a load resistance $R_{load}$, and/or a valve resistance $R_{valve}$. Flow rates $V_F$, $V_D$, pressures $P_F$, $P_D$, and/or resistances $R_{load}$, $R_{valve}$ may, at least in part, control concentrations of the fluids 80, 82 in the first and second sections 70, 72 of the membrane module 20 (e.g., salt content). Differences in concentrations may correspond to rates of osmosis and/or pressure changes in the first section 70 and/or the second section 72. An ECU 60 may be configured to provide fluid pressure commands $P_F$, $P_D$ for controlling output pressures of the feed pump 32 and/or the draw pump 36 (e.g., in addition to, or in lieu or instead of flow rates $V_F$, $V_D$).

With embodiments, such as generally illustrated in FIG. 3, an ECU 60 may be configured to control a fluid system 10 via controlling a feed pump flow rate $V_F$, a draw pump flow rate $V_D$, and/or a flush valve resistance $R_{valve}$. A flush valve 50 may be connected to a first section 70 of a membrane module 20, such as opposite from the feed pump 32. While a flush valve 50 may introduce some degree of inefficiency or loss (e.g., a parasitic loss), controlling the load 24 may not be feasible or practical, at least in some circumstances, and controlling a fluid output of the fluid system 10, at least in part, via a flush valve 50 may be preferred relative to no control. An ECU 60 may be configured to provide flow rate commands to a feed pump 32 and a draw pump 36 and/or resistance commands to a flush valve 50. An ECU 60 may determine commands according to feedback from a measurement of net power generated by a fluid system $P_{net}$, such as generally described herein. In embodiments, an ECU 60 may be configured to control both a load 24 and a flush valve 50, which may be connected to the same membrane module 20.

Figure 4:
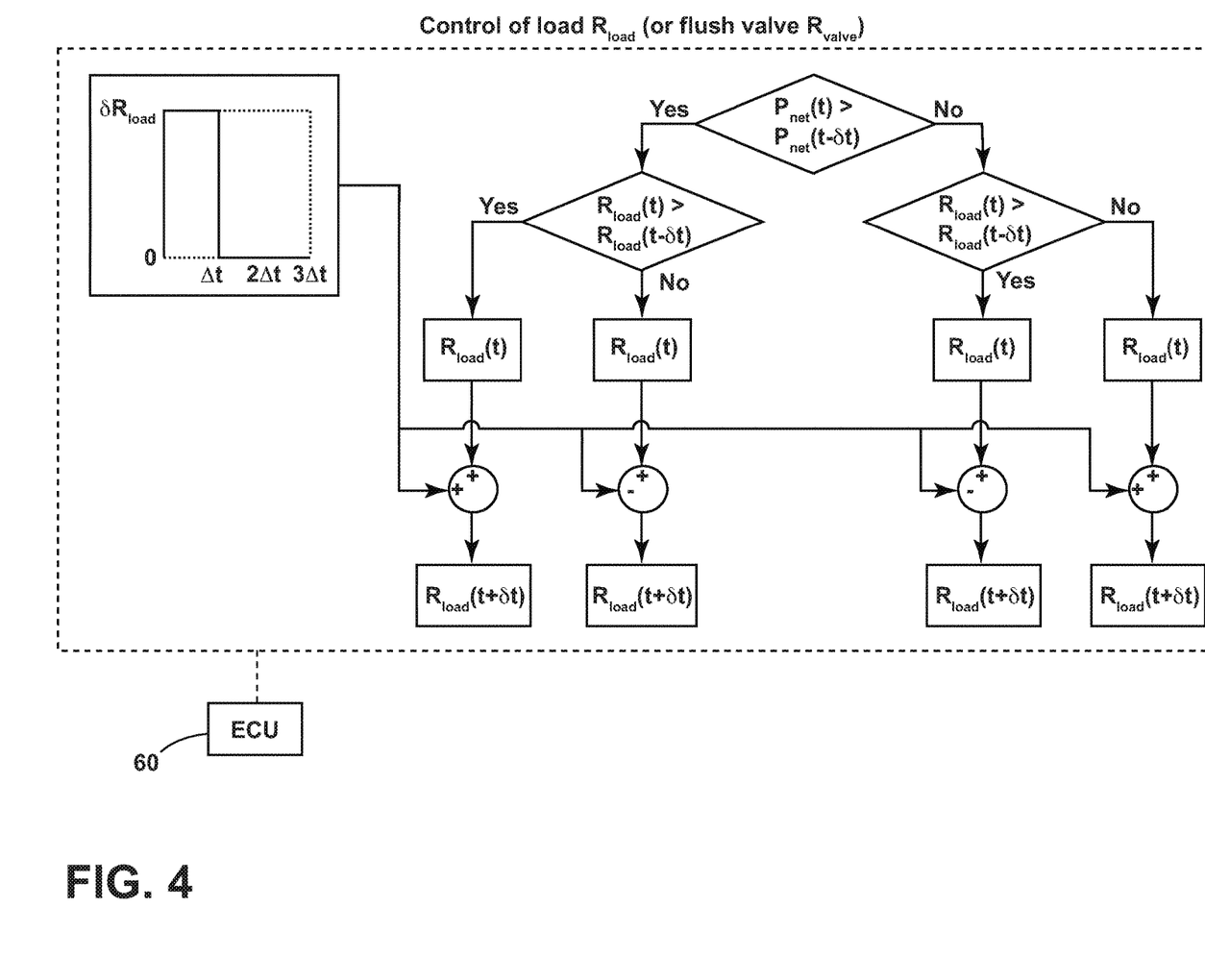
FIG. 4 is a flow diagram generally illustrating portions of an embodiment of a method of controlling a fluid system according to aspects and teachings of the present disclosure.
Figure 5:
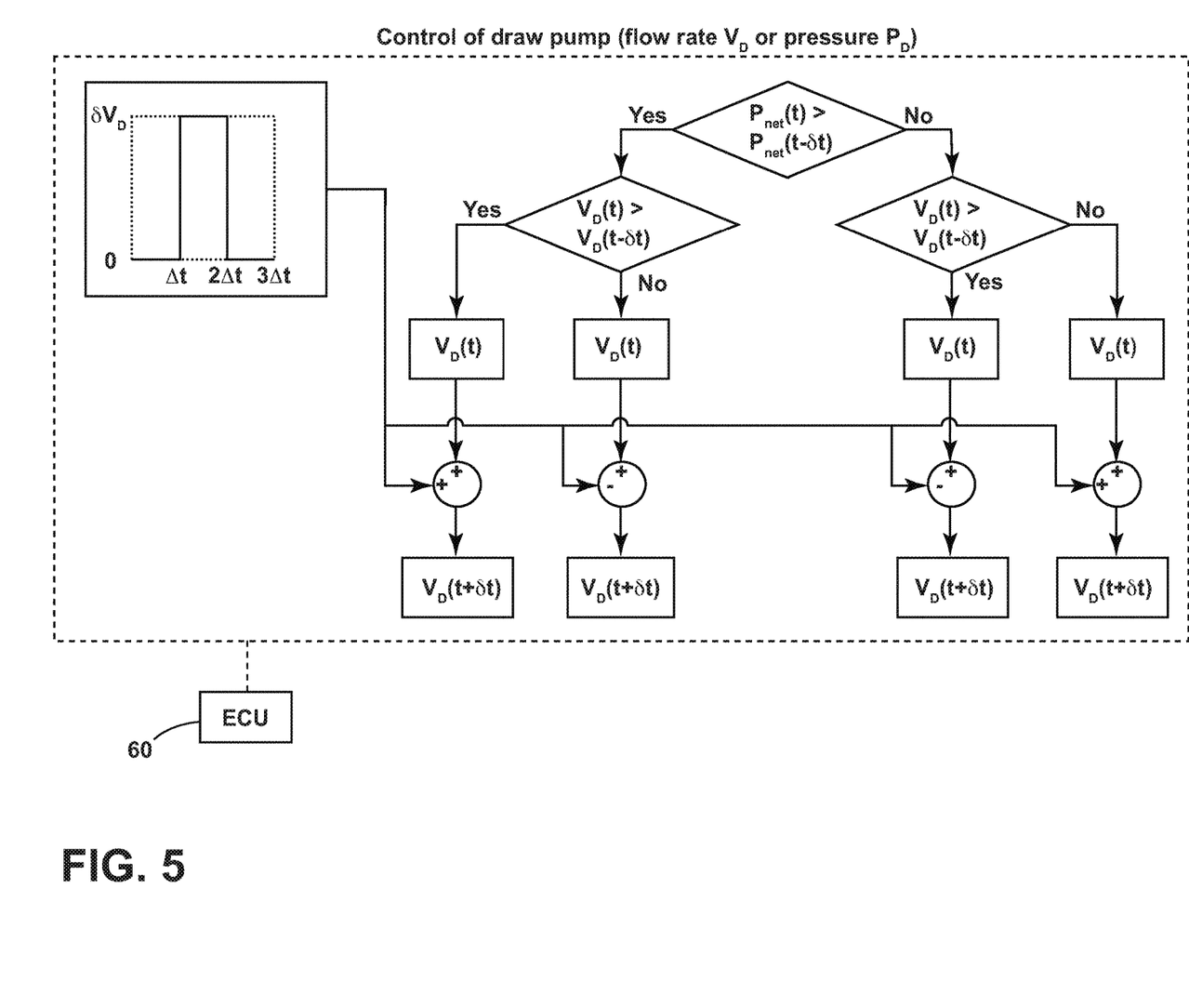
FIG. 5 is a flow diagram generally illustrating portions of an embodiment of a method of controlling a fluid system according to aspects and teachings of the present disclosure.
Figure 6:
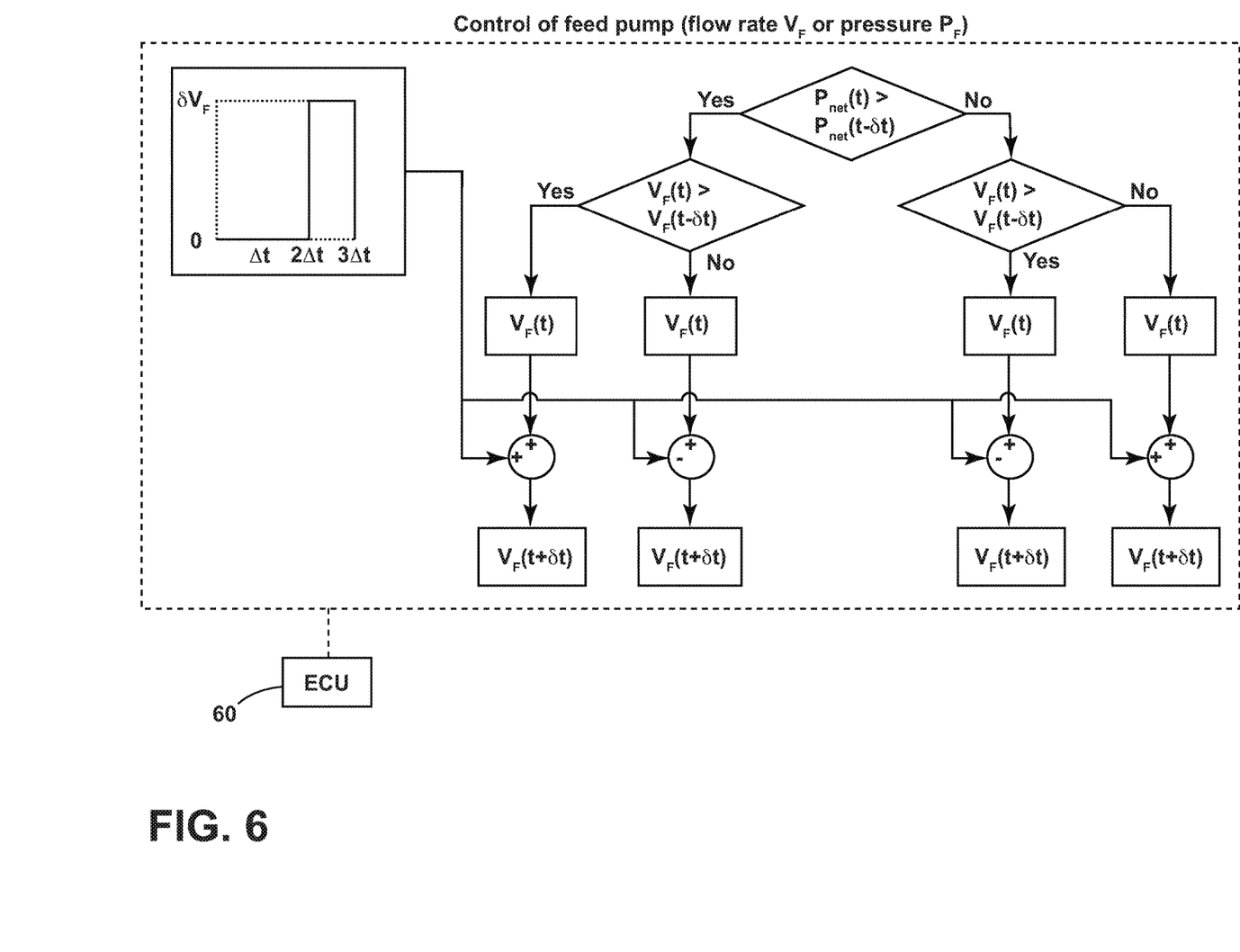
FIG. 6 is a flow diagram generally illustrating portions of an embodiment of a method of controlling a fluid system according to aspects and teachings of the present disclosure.

With embodiments, such as generally illustrated in FIGS. 4, 5, and 6, an ECU 60 may, for example, be configured to control a fluid system 10 via a perturb and observe (P&O) method that may be applied in an alternating sequence to a plurality of control variables. For example and without limitation, an ECU 60 may control (i) a load resistance/load switching frequency $R_{load}$, and/or a flush valve resistance $R_{valve}$ (see, e.g., FIG. 4), (ii) a draw pump flow rate $V_D$ and/or draw pump pressure $P_D$ (see, e.g., FIG. 5), and/or (iii) a feed pump flow rate $V_F$ and/or feed pump pressure $P_F$ (see, e.g., FIG. 6). The ECU 60 may be configured to vary a control signal (e.g., control signal $R_{load}$ to control the load and/or control signal $R_{valve}$ to control the flush valve) by a step (e.g., a resistance step $\delta R_{load}$, $\delta R_{valve}$) and/or may be configured to sample a change in net power $P_{net}$ at a time interval or sample rate $\delta t$. If a change in net power $P_{net}$ is positive in response to a change in a control signal, the ECU may vary the control signal by the same step $\delta x$ in the same direction. If a change in net power $P_{net}$ is negative, the ECU 60 may vary the signal by a step $\delta x$ in the opposite direction. Iteration may continue over a period of time $\Delta t$, after which the ECU 60 may maintain a signal at a substantially constant value. The same or a similar iterative process may be applied to a second control signal (e.g., steps $\delta V_D$ for a control signal $V_D$ to control a draw pump 36, such as generally illustrated in FIG. 5), a third control signal (e.g., steps $\delta V_F$ for control signal $V_F$ to control a feed pump 32, such as generally illustrated in FIG. 6), and/or or other control signals. An iterative process may be applied for control signals sequentially. For example and without limitation, an ECU 60 may iteratively determine a first command signal $R_{load}$ (e.g., a first iterative changing/determination), then iteratively determine a second command signal $V_D/P_D$ (e.g., a second iterative changing/determination), and then iteratively determine a third command signal $V_F/P_F$ (e.g., a third iterative changing/determination).

Figure 7:
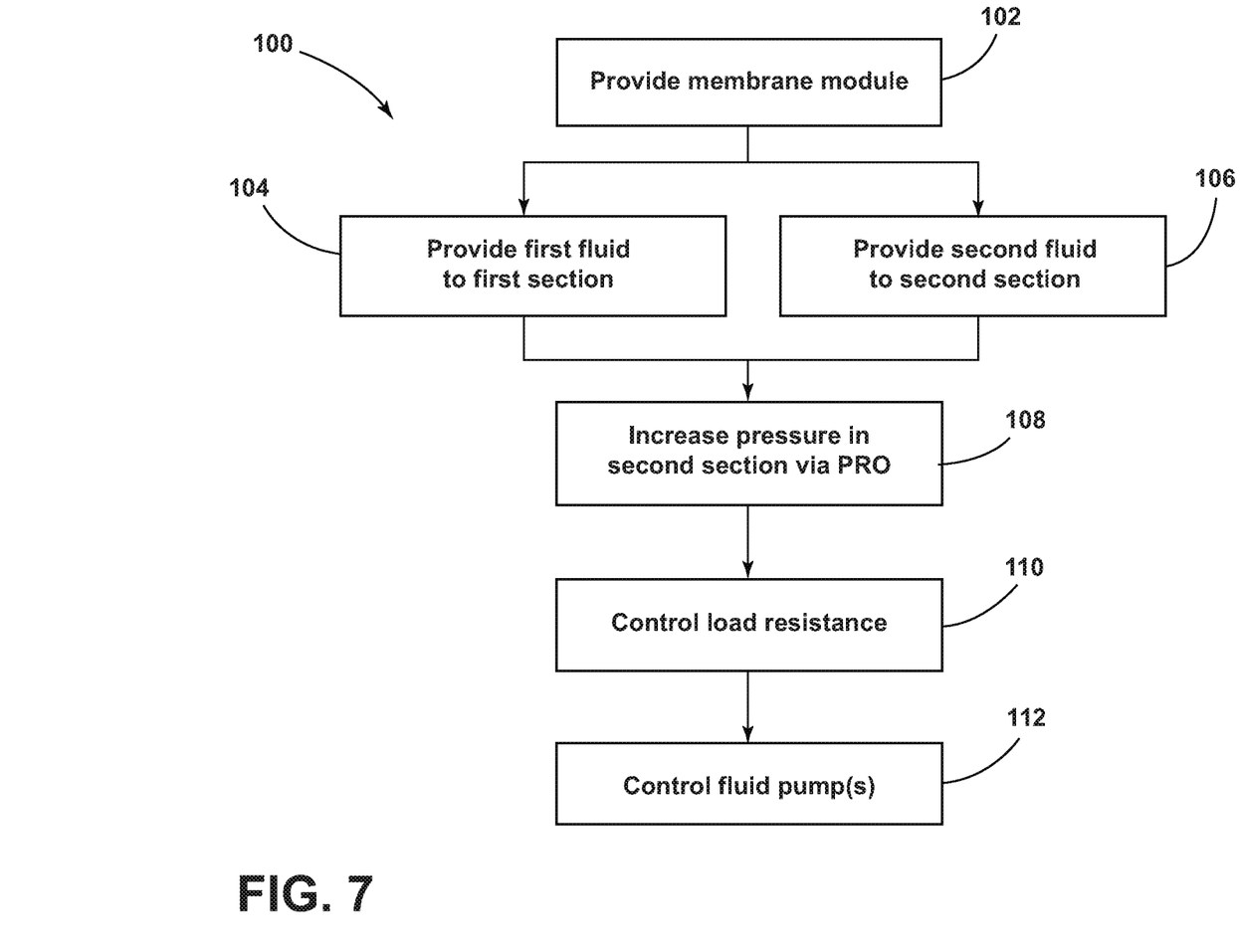
FIG. 7 is a flow diagram generally illustrating portions of an embodiment of a method of controlling a fluid system according to aspects and teachings of the present disclosure.

With embodiments, such as generally illustrated in FIG. 7, a method 100 of controlling a fluid system 10 may include providing a membrane module 20 having a first section 70 and a second section 72 separated by a semipermeable membrane 22 (step 102). The method 100 may include providing, via a feed pump 32 connected to the first section 70, a first fluid 80 to the first section 70 (step 104). The method 100 may include providing, via a draw pump 36 connected to the second section 72, a second fluid 82 to the second section 72 (step 106). The method 100 may include increasing a fluid pressure in the second section 72 via pressure retarded osmosis (step 108). The method 100 may include controlling, via the ECU 60, a resistance $R_{load}$ of a load 24 and/or a resistance $R_{valve}$ of a flush valve 50 (step 110). The load 24 may include a turbine, such as a water turbine. The method 100 may include controlling, via an electronic control unit (ECU) 60, a speed $V_F$ of the feed pump 32, a pressure $P_F$ of the feed pump 32, a speed $V_D$ of the draw pump 36, and/or a pressure $P_D$ of the draw pump 36 (step 112).

In embodiments, an ECU 60 may include an electronic controller and/or include an electronic processor, such as a programmable microprocessor and/or microcontroller. In embodiments, an ECU 60 may include, for example, an application specific integrated circuit (ASIC). An ECU 60 may include a central processing unit (CPU), a memory (e.g., a non-transitory computer-readable storage medium), and/or an input/output (I/O) interface. An ECU 60 may be configured to perform various functions, including those described in greater detail herein, with appropriate programming instructions and/or code embodied in software, hardware, and/or other medium. In embodiments, an ECU 60 may include a plurality of controllers. In embodiments, an ECU 60 may be connected to a display, such as a touchscreen display.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A method of controlling a fluid system, the method comprising:
   providing a membrane module including a first section and a second section, the first section and the second section being separated by a semipermeable membrane;
   providing, via a feed pump connected to the first section, a first fluid to the first section;
   providing, via a draw pump connected to the second section, a second fluid to the second section;
   increasing a fluid pressure in the second section via pressure retarded osmosis; and
   controlling or maximizing a net power generated by an external load connected to the second section, wherein controlling or maximizing the net power generated includes controlling, via an electronic control unit (ECU), operation of at least two of the feed pump, the draw pump, and a resistance of the external load based on or according to the net power generated.

2. The method of claim 1, wherein controlling the resistance of the external load includes iteratively changing the resistance and monitoring the net power generated.

3. The method of claim 2, wherein controlling the draw pump includes iteratively changing a speed of the draw pump and monitoring the net power generated.

4. The method of claim 3, wherein controlling the feed pump includes iteratively changing a speed of the feed pump and monitoring the net power generated.

5. The method of claim 4, wherein the iterative changings are conducted in a sequence such that a first one of the iterative changings is conducted first, a second one of the iterative changings is conducted after the first iterative changing, and a third one of the iterative changings is conducted after the second iterative changing.

6. The method of claim 1, including providing a flush valve connected to the first section, wherein controlling or maximizing the net power generated further includes controlling a resistance of the flush valve.

7. The method of claim 3, wherein iteratively changing the speed of the draw pump comprises controlling at least one of a draw pump pressure and a draw pump flow rate.

8. The method of claim 4, wherein iteratively changing the speed of the feed pump comprises controlling at least one of a feed pump pressure and a feed pump flow rate.

9. The method of claim 1, wherein controlling or maximizing the net power generated includes adjusting at least two of a feed flow rate, a draw flow rate and an applied pressure difference.

* * * * *